(12) United States Patent
daSilva

(10) Patent No.: US 6,445,937 B1
(45) Date of Patent: Sep. 3, 2002

(54) METHODS AND APPARATUS FOR MOBILE PHONE POWER MANAGEMENT

(75) Inventor: Ivan Pereira daSilva, Hillsborough, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/452,969

(22) Filed: Dec. 2, 1999

(51) Int. Cl.[7] .............................. H04B 1/38; H04M 1/00
(52) U.S. Cl. ...................................................... 455/574
(58) Field of Search ................................. 455/571, 572, 455/573, 574, 343

(56) References Cited

U.S. PATENT DOCUMENTS

| | | | |
|---|---|---|---|
| 5,091,942 A | * | 2/1992 | Dent ............................ 380/46 |
| 5,428,816 A | * | 6/1995 | Barnett et al. .............. 455/33.2 |
| 5,594,776 A | * | 1/1997 | Dent ............................ 379/58 |
| 5,991,635 A | * | 11/1999 | Dent et al. ................... 455/517 |
| 6,058,289 A | * | 5/2000 | Gardner et al. ............. 455/31.3 |
| 6,289,228 B1 | * | 9/2001 | Rotstein et al. .............. 455/574 |

FOREIGN PATENT DOCUMENTS

| | | | |
|---|---|---|---|
| GB | 2280086 | 1/1995 | ............ H04Q/7/20 |
| JP | 56-110357 A | 9/1981 | ............ H04B/7/26 |
| JP | 57-145448 A | 9/1982 | ............ H04B/7/26 |
| JP | 09327053 A | 12/1997 | ............ H04Q/7/14 |
| WO | WO 98/12862 | 3/1998 | .......... H04M/11/00 |

* cited by examiner

Primary Examiner—Daniel Hunter
Assistant Examiner—Tuan Tran
(74) Attorney, Agent, or Firm—Priest & Goldstein, PLLC

(57) ABSTRACT

A mobile telephone power management method and apparatus is disclosed that places the telephone in a dormant, or idle, mode. In this mode, battery power is only supplied to a device incorporated into the mobile telephone that monitors incoming radio frequency (RF) signals. If the device detects an inbound call, the device sends signals to switch on battery power to the mobile telephone baseband microprocessor. The device also sends stored registration information to the baseband microprocessor, thereby allowing the telephone to rapidly switch to active mode, and to answer the inbound call. This method allows the telephone to effectively emulate standby mode for weeks rather than days without the need for battery recharging.

18 Claims, 4 Drawing Sheets

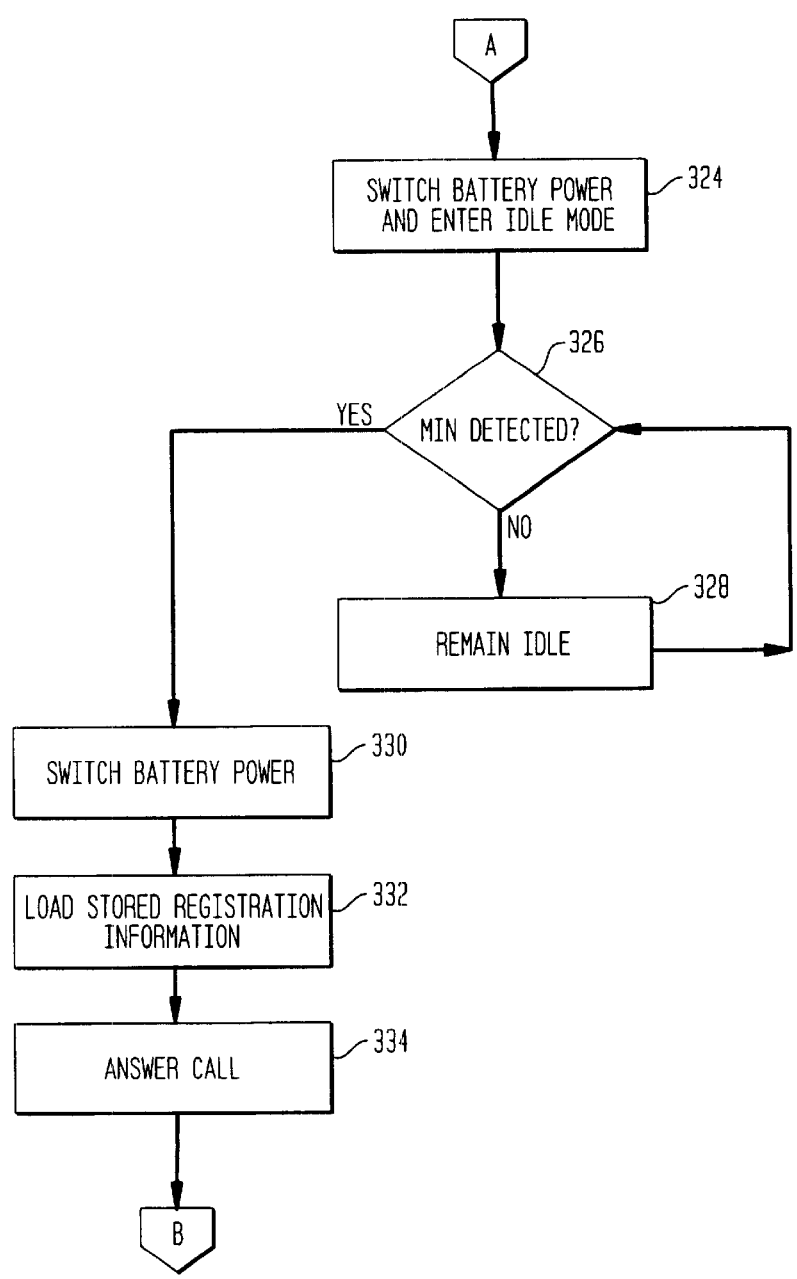

METHODS AND APPARATUS FOR MOBILE PHONE POWER MANAGEMENT

FIELD OF THE INVENTION

The present invention relates generally to improvements in managing battery power consumption in mobile telephones. In particular, the invention relates to advantageous methods and apparatus for establishing an operational state that consumes significantly less power than the standby state of a typical mobile telephone, yet provides the capability to rapidly resume a normal operational state.

BACKGROUND OF THE INVENTION

The rapid growth of the mobile telephone industry has resulted in millions of users of handheld, battery powered mobile telephones. Many users of such mobile telephones leave their telephones switched off unless they need to make an outgoing call, thereby conserving the unit's battery power for days, or even weeks. An increasing number of users, however, leave their telephones switched on all of the time so that they can receive incoming calls throughout the day and night. Most handheld mobile telephones have sufficient battery power to remain in standby mode for a period of hours; or as long as a day. As mobile telephone technology has advanced, newer models ha,e. decreased in size substantially, while still incorporating more features and functions that consume more battery power. One result of these technological advances is that the telephone's internal battery now typically occupies half, or more, of the total physical volume of the telephone, and may account for the majority of the unit's total weight. At the same time, the desire for longer operational time periods between battery recharge cycles has increased. Although new battery technologies, such as lithium-ion, are now supplanting the once ubiquitous nickel-cadmium, the state of the art in battery technology has not kept pace with consumer demand for longer life batteries.

A typical handheld mobile telephone can be manually switched on or off by use of a physical power switch. While switched off, the telephone battery may still supply a nominal amount of power to maintain a user's customizable features, such as telephone number lists, and the like. The power output capability of a mobile telephone battery typically degrades slowly over time due to a number of factors. Such factors include the hysteresis effect associated with recharging nickel-cadmium (Ni-Cad) batteries and internal leakage currents, and these factors may be accelerated by environmental conditions such as high storage temperatures, humidity, and the like.

When a mobile telephone is switched on, the unit must perform a power-up sequence that establishes a radio frequency (RF) link with an appropriate base station. Upon completion of this sequence, the telephone is in a standby mode of operation and is ready for use. The telephone's radio receiver actively monitors the signals from the nearest, or other appropriate, base station to determine if there are any incoming calls for the mobile telephone user. The base station alerts the mobile telephone to incoming calls by broadcasting the telephone's mobile identification number (MIN). The MIN is the same as the user's mobile telephone number, and is used to identify the mobile telephone unit to the mobile telephone network. If the MIN is being broadcast, the telephone responds by activating a ringer, or the like. If the subscriber answers the incoming call, the telephone switches to active mode, and the call is completed in full duplex operation. In full duplex, the telephone is simultaneously receiving and transmitting RF signals, and therefore consuming battery power at a very high rate. Upon completing a telephone call, the unit resumes standby mode operation, and is ready to initiate or accept another call. If the user switches the mobile telephone off to conserve battery power, the telephone may transmit a power-off signal to the base station. This signal can be utilized by the mobile telephone network to conserve RF bandwidth by not broadcasting the MINs of mobile telephones that the network has identified as being switched off.

Existing techniques for extending mobile telephone battery life include reducing the internal clock cycling of the telephone microprocessor, entering a sleep mode if the telephone is inactive for a predetermined period of time, utilizing more efficient radio amplifiers, and utilizing software algorithms that reduce the radio signal output level when the telephone user is listening, but not speaking, during a mobile telephone call. The methods and apparatus of the present invention. His described further below, can provide extended battery life when used alone or in combination with these existing techniques.

SUMMARY OF THE INVENTION

The present invention recognizes that a need exists in a variety of contexts for techniques to extend the effective operational time period between battery recharge cycles, irrespective of the particular battery technology utilized.

One embodiment of the present invention incorporates special circuitry and software into the design of a. standard mobile telephone unit. This circuitry and software sense the first radio frequency (RF) signal signifying an incoming call, and utilize that signal to rapidly switch the telephone into a normal operational state, thereby allowing a user to receive an incoming call. One implementation of this embodiment incorporates this special circuitry into a power control subsystem device that is incorporated into the design of a standard mobile telephone. This power control subsystem device may be incorporated into an integrated circuit (IC), an application specific integrated circuit (ASIC), or a digital signal processor (DSP). In another implementation of the present invention, this device may comprise a low power microprocessor, such as a Microchip PIC 12C509, and other components.

The power control subsystem device enables the mobile telephone to function as if the unit is in standby mode, while consuming significantly less power than such a mobile telephone ordinarily would in standby mode. In operation, the device monitors the appropriate radio frequencies to detect the mobile telephone's MIN, while the telephone's baseband microprocessor remains powered off. This mode of operation is known as idle mode. Since a mobile telephone baseband microprocessor must operate at a high clock frequency to provide real-time voice communications, it consumes a relatively large amount of power even when in standby mode. Since the device of the present invention provides very limited functionality, such as detecting the telephone's MIN and switching the baseband microprocessor on and off, it may operate at a relatively low clock frequency, and therefore consume much less power than a baseband microprocessor in standby mode.

Upon detecting the MIN, the device instructs the telephone to enter the active mode, thereby activating a telephone's ringer, or the like, to notify the telephone subscriber that there is an incoming call. If the subscriber chooses to answer the incoming call, the telephone remains in the active mode and operates in a normal manner. Upon completion of the telephone call, the telephone returns to the standby mode to await another call. The device may be programmed to return to the idle mode after a fixed period of time, or after a user selected period of time. The device may also be programmed to allow the telephone user to manually switch the telephone to idle mode. The device may incorporate a dedicated memory device, or it may utilize a portion of the telephone's memory. The memory is utilized to store the information that enables the telephone to rapidly resume an active operational state. Typically, when a mobile telephone is switched on, the unit must perform a power-on sequence whereby internal system checks, are performed, speed dialing numbers are loaded, and the like. The telephone then performs a registration process wherein the RF interface is established, a nearby base station is identified, the appropriate base station is located, RF channels are allocated and the telephone subscriber's MIN is broadcast. In one embodiment of the present invention, the memory device retains this registration information. When the telephone detects an incoming call, the stored registration information is supplied immediately to the telephone baseband microprocessor, thereby significantly reducing the time period required for initialization of the telephone.

In another embodiment of the present invention, the mobile telephone registration information is stored in a database at a mobile switching center (MSC) that is collocated with the base station. Typically, when a mobile telephone is switched off, it sends a signal to the MSC indicating that the telephone is being switched off. This allows the MSC to signal the mobile telephone network that the mobile telephone is not capable of terminating calls. This arrangement allows the mobile telephone network to notify the caller immediately, and eliminates the need to broadcast the mobile telephone's MIN over the network. In this embodiment of the present invention, a signal is sent to the MSC when the mobile telephone enters idle mode. This allows the MSC to store the mobile telephone user's registration information, and to signal the mobile network that the mobile telephone is in idle mode. Thereafter, if the MSC receives an incoming call from the public telephone network, the MSC checks to see if the called MIN is in its database. If so, then the MSC transmits the registration information to the mobile telephone. The mobile telephone enters standby mode upon detecting it's MIN. The mobile telephone receives the registration information from the MSC, thereby allowing the mobile telephone to rapidly resume active mode, and answer the incoming call. Storing the registration information in the MSC allows the device described above to operate without a dedicated memory for storing registration information within the mobile telephone.

A more complete understanding of the present invention, as well as other features and advantages of the invention will be apparent from the following detailed description and the accompanying drawings.

DESCRIPTION OF THE DRAWINGS

FIGS. 3A and 3B illustrate a process for switching in and out of idle mode in accordance with the present invention.

DETAILED DESCRIPTION

The present invention will now be described more fully with reference to the accompanying drawings, in which currently preferred embodiments of the invention are shown. However, this invention may be embodied in various forms and should not be construed as limited to the exemplary embodiments set forth herein. Rather, the representative embodiments are described in detail so that this disclosure will be thorough and complete, and fully convey the scope, operation, functionality, structure and potential of applicability of the invention to those skilled in the art.

Figure 1:
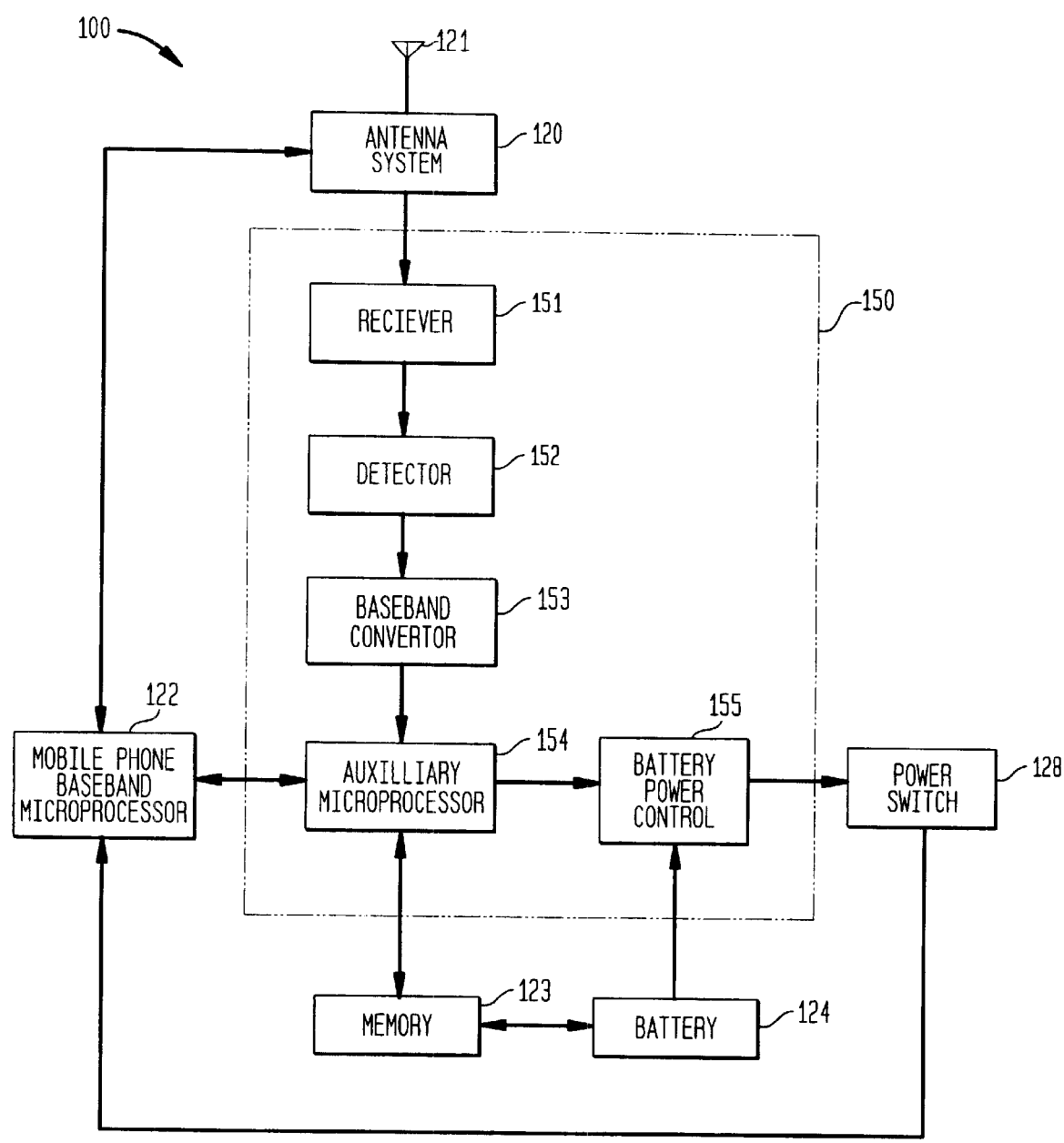
FIG. 1 illustrates a block diagram of a mobile telephone in accordance with the present invention.

FIG. 1 illustrates a mobile telephone 100 adapted for use in conjunction with the present invention as described further below. Mobile telephone 100 comprises an antenna system 120, a standard mobile telephone antenna 121, a mobile telephone baseband microprocessor 122, a memory 123, a rechargeable battery 124, a power switch 128 and an idle power control subsystem 150. The idle power control subsystem 150 comprises a receiver 151, a detector 152, a baseband converter 153, an auxiliary microprocessor 154 and a battery power control circuit 155. The idle power control subsystem 150 is utilized to switch'the operational mode of the mobile telephone into, and out of, idle mode. Power switch 128 consists of a physical button, as well as an electronic switch that is controlled by battery power control circuit 155 as described below.

In a typical mobile telephone application, when the telephone is initially powered on, the antenna system initiates the registration process to establish the proper RF interface. A typical mobile telephone operates utilizing a single RF interface, but a multi-mode telephone must determine which RF interface to establish based on available signals. Standard RF interfaces include frequency division multiple access (FDMA), time division multiple access (TDMA) and code division multiple access (CDMA). After the RF interface is established, the registration process continues with the identification of the telephone to the mobile network. The mobile telephone identifies itself to the appropriate mobile networkbase station by transmitting. the telephone subscriber's mobile identification number (MIN). The telephone then transmits a series of protocol signals to establish the correct allocation of RF channels, frequencies and other parameters. Once this process is completed, the telephone enters a standby mode, and is ready to switch to an active mode to initiate an outgoing call or answer an incoming call.

In the present invention, antenna system 120 is utilized to initiate the registration process and to establish the appropriate RF interface. As part of this process, the registration and protocol information is stored in memory 123. After completion of the registration process, the mobile telephone is ready for operation, and the user may initiate an outgoing call or answer an incoming call. The mobile telephone microprocessor 122 is utilized for all outgoing and incoming calling activity. Microprocessor 122 sends signals to auxiliary microprocessor 154 indicating that the telephone is in use, and thereby maintains the telephone in the active operational mode.

The idle power control subsystem 150 is utilized to switch the operational mode of the mobile telephone into, and out of, idle mode. When the mobile telephone is in idle mode, receiver 151 monitors the RF signals from antenna system 120 and sends those signals to detector 152. Detector 152 determines if the signals are intended for the mobile telephone user. For example, detector 152 determines if the signals represent an incoming call. If these signals represent an incoming call, detector 152 sends those signals to baseband converter 153. Baseband converter 153 converts the received analog RF signals to digital signals, and then sends those digital signals to the auxiliary microprocessor 154. Auxiliary microprocessor 154 then sends a signal to battery power control circuit 155 to switch on battery power to the mobile telephone baseband microprocessor 122, as well as the rest of the mobile telephone components. Auxiliary microprocessor 154 also retrieves the registration information stored in memory 123 and sends it to microprocessor 122. The mobile telephone is now operational in active mode, and can answer the incoming call.

Auxiliary microprocessor 154 continues to monitor the mobile telephone baseband microprocessor 122 to determine if the mobile telephone is actively being used. If the mobile telephone has been inactive for a predetermined period of time, auxiliary microprocessor 154 initiates a sequence to put the telephone into idle mode. The predetermined period of time may be specified by the user, or may be preprogrammed into the auxiliary microprocessor 154. The user may also initiate idle mode manually by pressing an appropriate keypad key. To initiate idle mode, auxiliary microprocessor 154 sends a signal to battery power control circuit 155 to switch off battery power. Battery. power control circuit 155 sends a signal to mobile telephone switch 128 to switch off the power to all components of mobile telephone 100, with the exception of the idle power control subsystem 150. The mobile telephone 100 is now in idle mode, and the idle power control subsystem 150 continues to operate to determine when the telephone should be switched back to active mode.

In another embodiment of the present invention, auxiliary microprocessor 154 is further programmed to periodically initiate a new registration process. In this embodiment, auxiliary microprocessor 154 switches mobile telephone 100 from idle mode to active mode. Antenna system 120 then initiates a new registration process, and stores updated registration information in memory 123. After this new registration process is completed, auxiliary microprocessor 154 immediately switches mobile telephone 100 from active mode to idle mode.

Figure 2:
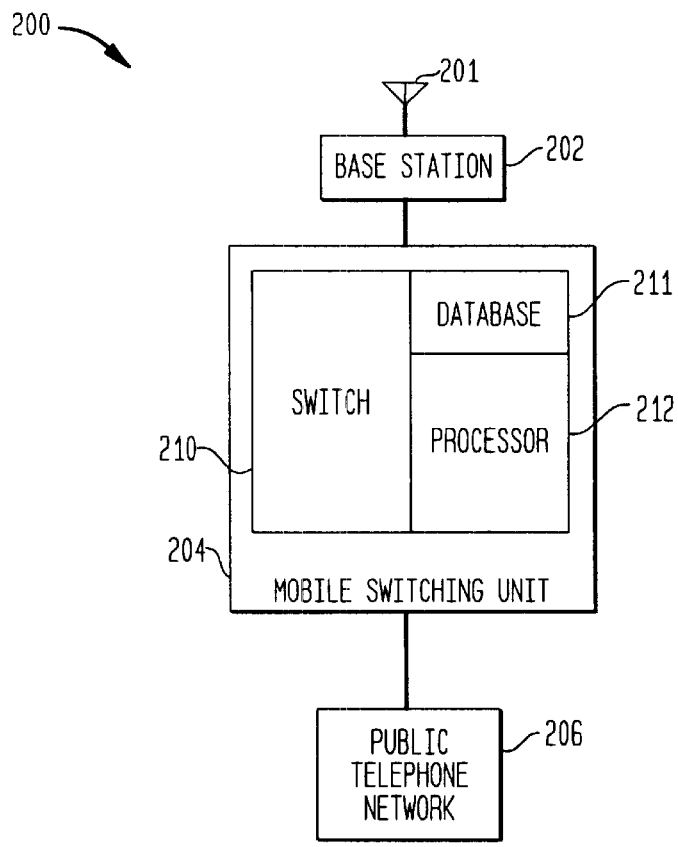
FIG. 2 illustrates a block diagram of a base station that interfaces to a public telephone network.

FIG. 2 illustrates a fixed telephone infrastructure 200 for interfacing a mobile telephone, such as the mobile telephone 100 illustrated in FIG. 1, to the public telephone network for use in conjunction with the present invention as described further below. Fixed telephone infrastructure 200 comprises a base station 202, an antenna.201, a mobile switching station 204 and the public service telephone network 206. The mobile switching base station 204 is comprised of a telephone switch 10, a database 21 1 and a processor 212. In another embodiment of the present invention, a mobile telephone, such as mobile telephone 100 as illustrated in FIG. 1, may send a message to base station 202 via RF signals at the time the mobile telephone enters idle mode. Base station 202 sends this message to mobile switching center (MSC) 204, where the message is stored in database 211. Database 211 comprises such information as the registration information for all of the mobile telephones with which base station 202 is actively communicating, the location information associated with each of the active mobile telephones, a billing database, and the like. The MSC is connected to the public telephone network (PTN) 206, and serves as the gateway between the PTN 206 and the base station 202. In operation, the database 211 would contain an entry to indicate if a given mobile telephone is switched off. If an incoming call for a switched off mobile telephone is routed from the PTN 206 to MSC 204, the processor 212 would fetch the appropriate entry from database 211. Processor 212 would immediately send a message through switch 210 to the PTN 206 to inform the caller that the desired mobile telephone is switched off. If the mobile telephone is in idle mode, database 211 would contain an appropriate entry as well as the telephone's registration information.

In this embodiment, if an incoming call destined for the mobile telephone is routed from the PTN 206 to MSC 204, the processor 212 would fetch the entry from database 211. The processor 212 would then send the telephone's MIN and the registration information through switch 210 to base station 202 for broadcast to the mobile telephone. The mobile telephone idle power control subsystem receives the MIN and the registration information, and thereby switches the telephone from. idle to active mode, allowing the telephone to receive the incoming call. This embodiment of the present invention would allow the idle power control subsystem 150 described above to operate without a separate memory device, and without utilizing the memory of the baseband microprocessor of the telephone. This arrangement allows for a further minimization of the mobile telephone's power consumption in idle mode, and allows for a lower cost idle power control subsystem design.

Figure 3A:
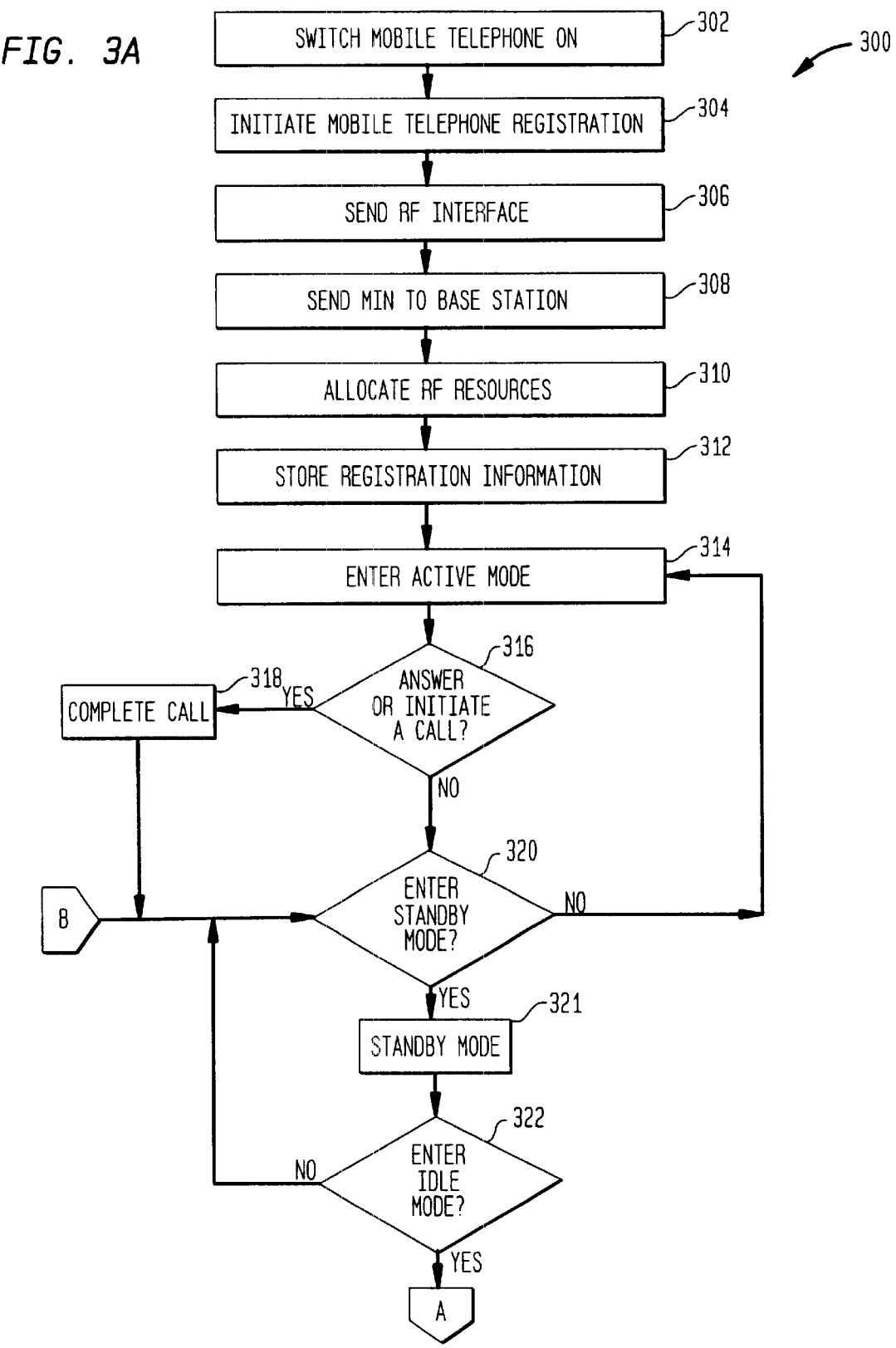

FIGS. 3A and 3B illustrate a method 300 for switching a mobile telephone into and out of idle mode in accordance with the present invention. The process begins at step 302 when a mobile telephone. such as the mobile telephone 100 as illustrated in FIG. 1, is switched on manually by pressing the telephone's power switch. At step 304, the mobile telephone registration process begins and the telephone is identified to the mobile telephone network. At step 306, the appropriate RF interface is established. Proceeding to step 308, the telephone's mobile identification number (MIN) is transmitted to a mobile telephone network base station, such as the mobile telephone network base station 202 shown in FIG. 2. At step 310, the mobile telephone network allocates RF resources to the mobile telephone, such as RF channels, frequencies and other parameters.

At step 312, the registration information is stored in a telephone memory, such as memory 123 as illustrated in FIG. 1. Upon completion of step 312, the telephone enters active mode at step 314, and the telephone is ready for normal operation. At step 316, a telephone call may be answered or initiated by the mobile telephone user. If a call is not answered or initiated, the process proceeds to step 320. If the user continues to not answer or initiate a call, the process proceeds to enter standby mode at step 321. If instead the user chooses to answer or initiate a call at step 316, the process proceeds to step 318 where the call is completed. Upon completion of the call, the process returns to step 320. If the user chooses to make another call at step 320, the process proceeds back to step 314. Once the telephone enters standby mode at step 320, the process may enter idle mode based upon the passage of a predetermined period of time. If the user chooses to answer or initiate another call, the process returns to step 320 as described above.

At step 322, if the predetermined period of time has elapsed, however, the process proceeds to step 324. At process step 324, a microprocessor, such as the auxiliary microprocessor 154 as illustrated in FIG. 1, sends a signal to a circuit, such as battery power control circuit 155 as illustrated in FIG. 1. This signal instructs the battery power control circuit to switch off the telephone's power switch, such as the power switch 128 as illustrated in FIG. 1, and the telephone enters idle mode. The process continues at step 326, where a power control subsystem, such as the power control subsystem 150 as illustrated in FIG. 1, monitors the received RF signals to determine if the telephone's MIN is detected. If the MIN is not detected, the process proceeds to step 328 and the telephone remains in idle mode, and the power control subsystem continues to monitor the received RF signals at step 326. If the MIN is detected at step 326, the process proceeds to step 330. At step 330, a microprocessor, such as the auxiliary microprocessor 154 shown in FIG. 1, sends a signal to a battery power control circuit instructing the circuit to switch on a telephone's power switch.

Proceeding to step 332, the microprocessor retrieves the registration information stored in a memory, such as the memory 123 shown in FIG. 1, and loads the information into the telephone's baseband microprocessor, such as baseband microprocessor 122 shown in FIG. 1. At step 334, the mobile telephone has returned to an active mode and accepts, or answers, the incoming call. Upon completion of the incoming call, the process returns to step 320, and the process repeats.

Figure 4:
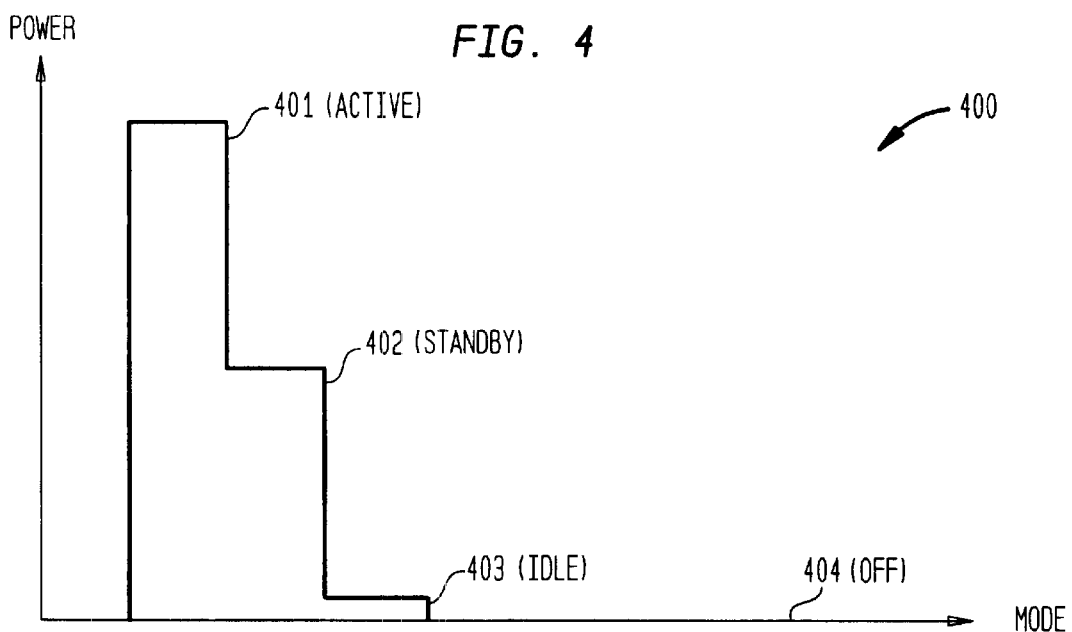
FIG. 4 illustrates a power consumption chart of a mobile telephone in accordance with the present invention.

FIG. 4 illustrates a power consumption chart 400 that compares the levels of power consumption for a mobile telephone in accordance with the present invention, such as mobile telephone 100 as shown in FIG. 1. The power levels for standby mode, idle mode and off mode are charted relative to normal full power operation when the telephone is transmitting and receiving. The active mode 401 is the mode of operation while a telephone call is in progress. In this mode, the mobile telephone is receiving and transmitting RF signals. In this mode, the telephone is consuming maximum battery power since the baseband microprocessor and the antenna system, such as baseband microprocessor 122 and antenna system 120 as shown in FIG. 1, are all powered. The standby mode 402 is the mode of operation when the mobile telephone user may answer or initiate a telephone call. In this mode of operation, all of the components of the mobile telephone are active. The antenna system and the baseband microprocessor are receiving, but are not transmitting, RF signals, to detect an incoming call. The baseband microprocessor is still operating at a relatively high clock frequency in order to allow real-time voice communications. Although this mode uses less power than active mode, the power consumption is still substantial due to the number of telephone components that are powered, and the high frequency operation of the baseband microprocessor. The idle mode 403 is the mode of operation where a mobile telephone, in accordance with the present invention, is operating in a reduced power state. In the idle mode, the mobile telephone is providing power only to an idle power control subsystem, such as the idle power control subsystem 150 as shown in FIG. 1. Minimal power, or no power, is being provided to the baseband microprocessor, and the antenna system is operating, to receive, but not transmit, RF signals. In this mode, battery power consumption is very low, thereby allowing very long periods of operation in idle mode. The off mode 404 is the mode where the mobile telephone is switched off, and the battery is not supplying power to any components of the mobile telephone.

While the present invention is disclosed in the context of a presently preferred embodiment, it will be recognized that a wide variety of implementations may be employed by persons or ordinary skill in the art consistent with the above discussion and the claims that follow below. Such implementations of the present invention may include the use of programmable microprocessors, application specific integrated circuits, digital signal processors, and. the like.

I claim:

1. An idle power control subsystem for controlling a low power idle operational mode of a mobile telephone, comprising:

a radio frequency (RF) receiver, the receiver being operable to only receive RF signals;

a mobile identification number (MIN) detector connected to an output of said RF receiver;

a baseband converter for converting analog RF signals from said MIN detector to digital signals;

a battery power control circuit operable to switch a mobile telephone into and out of idle mode; and a main control circuit being operable to send a signal to said battery power control circuit upon said main control circuit receiving the MIN of said mobile telephone to increase battery power to a mobile telephone baseband processor.

2. The idle power control subsystem of claim 1 further comprising a memory for storing registration information for said mobile telephone.

3. The idle power control subsystem of claim 1 wherein said main control circuit is a low power microprocessor having a relatively low clock frequency.

4. The idle power control subsystem of claim 1 wherein the power control subsystem comprises an application specific integrated circuit (ASIC).

5. A mobile telephone for communicating with a mobile telephone network, said mobile telephone being operable to switch into a battery power conserving idle mode comprising:

a mobile telephone baseband microprocessor;

a memory;

a battery;

an antenna system for receiving and transmitting RF signals;

an electronic power switch operable to manually or electronically switch said baseband microprocessor on and off; and an idle power control subsystem, said idle power control subsystem being operable to send a signal to said electronic power switch to control the operational mode of the mobile telephone upon detection of an incoming call.

6. The mobile telephone of claim 5 wherein said idle power control subsystem comprises:

a radio frequency (RF) receiver, the receiver being operable to only receive RF signals;

a mobile identification number (MIN) detector;

a baseband converter for converting analog RF signals from said MIN detector to digital signals;

a memory:

a battery power control circuit for switching a mobile telephone into and out of idle mode; and a main control circuit being operable to send a signal to said battery power control circuit upon said main control circuit receiving the MIN of said mobile telephone.

7. The mobile telephone of claim 6 wherein said main control circuit is a low power microprocessor.

8. The mobile telephone of claim 6 wherein the idle power control subsystem comprises an application specific integrated circuit (ASIC).

9. The mobile telephone of claim 5 wherein said idle power control subsystem is operable to switch said mobile telephone into idle mode after a predetermined period of time.

10. The mobile telephone of claim 5, further comprising a mobile identification number (MIN) detector, and wherein said idle power control subsystem is operable to switch said mobile telephone out of idle mode upon said mobile identification number (MIN) detector detecting the MIN of said mobile telephone.

11. A method for minimizing the power consumption of a mobile telephone having a mobile telephone baseband processor, the method comprising the steps of:

initiating a registration of a mobile telephone with a mobile telephone network;

completing said registration and stoning said registration information in a memory;

determining that the telephone's MIN, indicating an incoming call, has not been detected during a predetermined period of time; and sending a signal to a power control circuit separate from the mobile telephone baseband processor in response to the passage of the predetermined period of time, said power control circuit being operable to substantially reduce the power supplied to the mobile telephone baseband processor to switch said mobile telephone to an idle power mode, thereby conserving battery power.

12. A method for controlling the operational mode of a mobile telephone, the method comprising the steps of:

receiving mobile telephone RF signals;

monitoring said RF signals for the mobile identification number (MIN) associated with said mobile telephone;

detecting said MIN, said MIN indicating an incoming telephone call;

converting said RF signals indicating an incoming telephone call to digital signals; and sending said digital signals to a low power microprocessor, which upon recognizing an incoming telephone call generates an output signal to controllably increase the power supplied to a mobile telephone baseband microprocessor.

13. The method of claim 12 further comprising the steps of:

sending said output signal from said low power microprocessor to a power control circuit; and switching on battery power to provide operating power to the mobile telephone baseband microprocessor.

14. The method of claim 13 further comprising the steps of:

utilizing said low power microprocessor to retrieve mobile telephone registration information stored in a memory; and sending said registration information to the mobile. telephone baseband microprocessor, thereby rapidly switching said mobile telephone from idle mode to active mode.

15. A method for minimizing the power consumption of a mobile telephone, the method comprising the steps of:

initiating a registration of said mobile telephone with a mobile telephone network;

sending said registration information from the mobile telephone network to a mobile switching center;

storing said registration information in a mobile switching center database;

sending a message from said mobile telephone to the mobile switching center database, said message indicating that an idle power control subsystem is automatically switching the mobile telephone to an idle power mode; and sending a signal from said idle power control subsystem to a power control circuit, said power control circuit being operable to switch said mobile telephone to an idle power mode in response to said signal, thereby conserving battery power.

16. The method of claim 15 wherein said registration information stored in said database includes a mobile identification number (MIN) associated with said mobile telephone.

17. A method for controlling the operational mode of a mobile telephone, the method comprising the steps of:

receiving a mobile identification number (MIN) from a public telephone network, said MIN associated with a mobile telephone, and sending said MIN to a mobile switching center;

looking up said MIN in a database associated with a mobile switching center;

retrieving mobile telephone registration information associated with said MIN from said database;

sending said mobile telephone registration information to a mobile telephone base station;

transmitting said MIN and registration information from said mobile telephone base station to a mobile telephone associated with said MIN;

receiving the MIN and registration information from said mobile telephone and sending said registration information to an idle power control subsystem;

sending a signal from said idle power control subsystem to a battery power control circuit to switch on a mobile telephone baseband microprocessor;

sending said registration information from said idle power control subsystem to said baseband microprocessor; and rapidly switching said mobile telephone from idle mode to active mode utilizing the signals from the idle power control subsystem.

18. A method for updating the registration information stored in the memory of a mobile telephone, the method comprising the steps of switching a mobile telephone from idle mode to active mode after a predetermined period of time;

initiating a registration of said mobile telephone with a mobile telephone network;

storing said updated registration information in a mobile telephone memory; and sending a signal to a power control circuit, said power control circuit being operable to switch said mobile telephone to an idle power mode upon detection of an incoming call, thereby conserving battery power.

* * * * *